Nov. 28, 1967  A. P. MacKENZIE ET AL  3,355,057
DESICCATOR SEAL
Filed Dec. 31, 1964
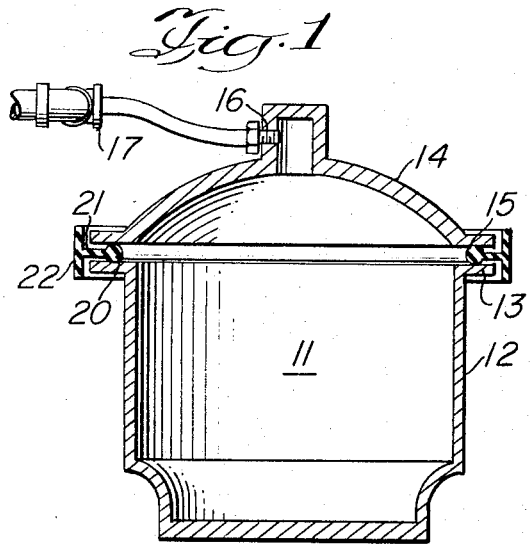
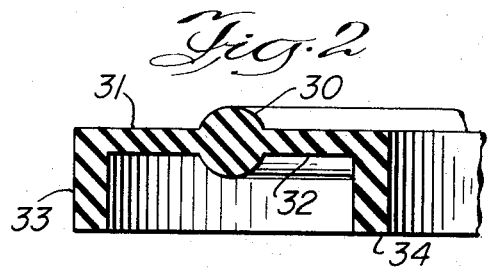
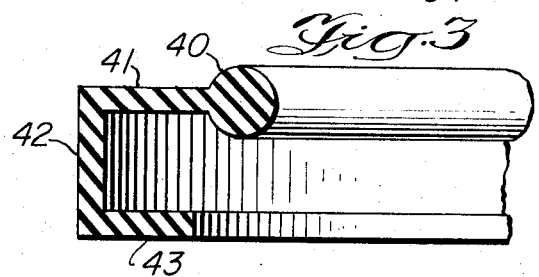
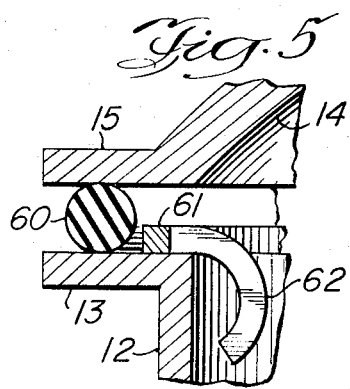
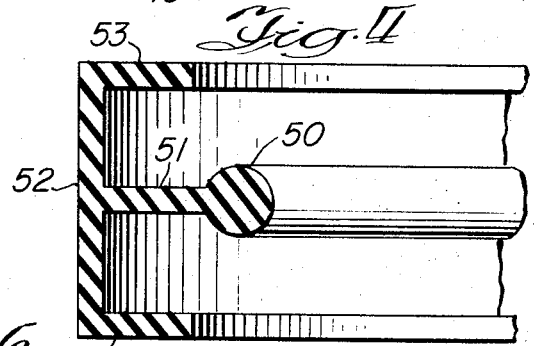
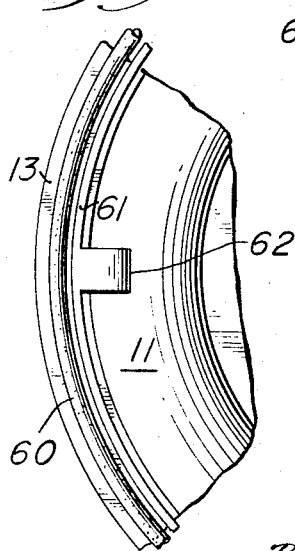
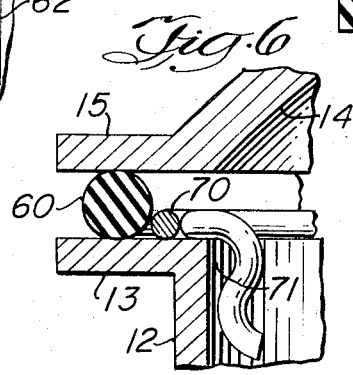
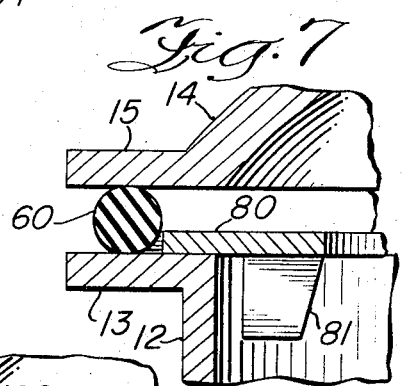
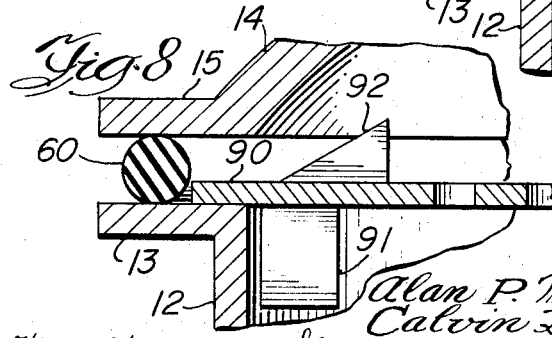
INVENTORS.
Alan P. MacKenzie
Calvin Kroener
By Hofgren, Wegner, Allen, Stellman & McCord ATTORNEYS.

United States Patent Office 3,355,057
Patented Nov. 28, 1967

3,355,057
DESICCATOR SEAL
Alan P. MacKenzie and Calvin Kroener, Madison, Wis., assignors to La Pine Scientific Company, a corporation of Illinois
Filed Dec. 31, 1964, Ser. No. 422,760
9 Claims. (Cl. 220—46)

ABSTRACT OF THE DISCLOSURE

A desiccator and seal therefor including a bowl having an upper horizontal flange and an easily removable cover having a lower horizontal flange adapted to mate with the horizontal flange on the bowl and a seal having a circular cross section interposed between the flanges together with means for conforming the seal to the perimetrical shape of the flanges.

Background of the invention

In the past, desiccators have been commonly formed with horizontal flanges on both the cover and the bowl. Customarily, the desiccators have been made of glass. Thus, to provide a seal between the cover and the bowl, the complementary surfaces of the horizontal flanges are customarily ground. Of course, mating ground glass surfaces do not provide a perfect seal. Thus, it has been necessary for the user of the desiccator to coat the surfaces with large amounts of grease to provide a seal therebetween. Oftentimes, and particularly when the desiccator is evacuated, the grease tends to be drawn into the desiccator itself where it may run down the side wall and perhaps into contact with samples contained therein. This results in contamination of the sample with the net result of a ruined experiment. Furthermore, since the grease will flow, oftentimes in the case of vacuum desiccators, the vacuum is maintained.

Summary of the invention

It is an object of this invention to provide an improved sealing means for desiccators.

It is a further object of the invention to provide an improved seal for desiccators wherein little or no grease is needed thereby minimizing the possibility of sample contamination.

It is a further object of the invention to provide an improved sealing means for desiccators whereby vacuum may be maintained therein without loss for substantial periods of time.

It is a further object of the invention to provide an improved seal for desiccators in combination with means for properly locating the seal on the desiccator.

It is still another object of the invention to provide an improved seal for desiccators wherein the locating means are integrally formed with the seal in a one-piece unit.

Still another object of the invention is the provision of an improved seal for desiccators in combination with means associated with the seal for properly locating the cover on the desiccator.

It is still a further object of the invention to provide locating means for the desiccator cover as an integral formation on the sealing means.

Other objects and advantages provided by the invention will become apparent in conjunction with the following detailed disclosure.

Description of the drawings

FIGURE 1 is a vertical section through a desiccator having a seal embodying the invention;

FIGURE 2 shows a cross section of another form of the improved desiccator seal;

FIGURE 3 shows a cross section of a still further modification of the invention;

FIGURE 4 shows a cross section of still another modification of the invention;

FIGURE 5 shows still another embodiment of the invention wherein the locating means are separate from the sealing means;

FIGURE 6 shows a modification of a form of FIGURE 5;

FIGURE 7 shows still a further modification of a device made according to the invention;

FIGURE 8 shows still another modification of a seal and locating means made according to the invention; and FIGURE 9 is a plan view of FIGURE 5 with the desiccator cover removed.

Detailed description

As seen in FIGURE 1, a vacuum type desiccator is generally indicated at 11. The desiccator comprises a bowl having a vertical side wall 12. On the upper end of the side wall 12 is a horizontally extending flange 13. The desiccator is provided with a removable cover 14 having complementary horizontally extending flanges 15. The desiccator is provided with a port 16 which is connected to a vacuum source 17.

Placed between the flanges 13 and 15 of the desiccator is an annular seal made in accordance with the invention which comprises a substantially circular member 20 having a circular cross section. In accordance with the invention there is provided on the seal 20 an outwardly extending web 21 which terminates in a flange-like portion 22 which extends both upwardly and downwardly from the web a substantial distance. The extent of these flanges is such that the downwardly projecting portion of the flange 22 fits about the outermost extremity of the horizontal desiccator bowl flange 13 thereby centering the seal on the bowl. Similarly, the upward extension is such as to extend about the outermost extremity of the horizontal flange 15 of the cover 14 to center the cover on the seal.

Preferably, the sealing members are formed from silicone rubbers, "Neoprene" or "Viton," the latter being a flow elastomer manufactured by the E. I. du Pont de Nemours Company. Through use of the invention utilizing seals formed of "Neoprene," vacua of a fraction of a millimeter of mercury were retained for over a week at room temperature, and for similar times when the desiccators were evacuated and subsequently stored at temperatures as low as minus 20° and minus 30° C. Satisfactory sealing engagement with seals made in accordance with the invention were made at temperatures as low as minus 20° or minus 30° C. without warming the sealing rings. If the rings are fabricated from "Viton" material, an adequate seal is formed at temperatures as low as about minus 80° C.

Furthermore, by use of a flexible seal, the voids in the conventional ground glass flanges of desiccators are partially filled by the seal material. Thus, little or no grease is required to effect the proper seal. Accordingly, with a seal embodying the invention, the use of a desiccator is much less messy, both in terms of application of grease by the user and the possibility of sample contamination by excess grease. Obviously, this feature results in a significant saving of time.

The use of seals with locating means also results in a significant saving of time. Clearly, proper location of the seal on the desiccator is a very simple matter when the locating means are used. The locating means insure that a proper seal will be obtained in virtually every case. Thus, there is very little chance of seal failure resulting in improper drying of the sample.

FIGURE 2 shows another form of the invention. A sealing ring 30 is centrally located between an outwardly extending web 31 and an inwardly extending web 32. Both webs 31 and 32 have downwardly extending flange-like portions 33 and 34, respectively. As in the case of the FIGURE 1 embodiment, the downturned flange-like portion 33 fits about the flange 13 of the desiccator to center the bowl thereon. The downturned portion 34 fits within the vertical wall 12 to provide an additional locating function.

Still another form of the invention is shown in FIGURE 3. The sealing ring 40 has an outwardly extending web 41. Extending downwardly from the outermost extremity of the web portion 41 is a flange-like portion 42 which terminates in an inwardly extending end portion 43. The inwardly extending end portion 43 fits under the horizontally extending flange 13 thereby preventing inadvertent displacement of the seal, while the downturned flange-like portion 42 provides a locating function.

The embodiment shown in FIGURE 4 is generally similar to that shown in FIGURE 3. Here the sealing member is designated at 50 and the outwardly extending web at 51. At the outermost extremity of the web 51 is an upwardly and downwardly extending flange-like portion 52 which terminates at both its upper and lower ends with inwardly extending end portions 53 and 54, respectively. This form of the seal is used in a manner generally similar to that shown in FIGURE 3. However, the upper inwardly extending end portion 53 serves the additional purpose of fitting about the cover flange 15 and serves to locate and hold the desiccator cover in the proper position.

The embodiment shown in FIGURE 5 utilizes as a sealing member, a ring 60. The locating means in this embodiment is separate from the sealing member. It comprises a plastic or metal ring 61 which rests on the lower flange 13 of the desiccator. Extending downwardly and inwardly from the ring 61 is a projection 62 which terminates in close adjacency to the vertical side wall 12 of the desiccator. The projection 62 serves to locate the ring 61 in a proper position on the flange 13, which in turn locates the seal 60 on the flange. Naturally, the height of the locating member 61 is substantially less than that of the seal 60 in order to preclude interference between the cover 14 and the ring 61. As shown in FIGURES 5 and 9, the projection 62 comprises an integral formation of the locating ring 61 and may be formed thereon by conventional stamping or die forming operations.

FIGURE 6 shows a modification of the device similar to that shown in FIGURE 5 wherein the locating ring is numbered 70 and a projection is shown at 71. Preferably, both are formed of wire or rod stock. In this embodiment, the projection 71 is a separate member from the ring 70, but is attached thereto by means of welding, soldering or the like.

FIGURE 7 shows still a further embodiment similar to that shown in FIGURE 5 wherein a locating ring 80 is preferably made of plastic and has integrally molded thereon a downwardly projecting portion 81. Projection 81 in the FIGURE 7 embodiment serves the same purpose as projection 62 in the FIGURE 5 embodiment.

FIGURE 8 shows still a further embodiment of the invention. Here the separate locating ring is designated as 90 and is preferably formed of plastic. Projecting downwardly therefrom and in close adjacency to the side wall is a projection 91 which serves the same purpose as the projection 62 in the FIGURE 5 embodiment. Projecting upwardly, and as an integral molded part of the ring, are tabs 92. Preferably, the locating ring is so dimensioned that the tabs 92 are in close adjacency to the cover 14 and thereby serve to locate the cover 14 to insure that the cover 14 is in sealing engagement with the sealing ring 60. To serve this end, the upper surface of the tabs 92 is made to substantially conform to the shape of the cover 14.

Having described our invention in terms of specific embodiments, as required by 35 U.S.C. 112, we do not wish to be limited to the details and construction described above, but rather to have our invention construed broadly in accordance with the true spirit thereof as set forth in the following claims.

We claim:

1. A desiccator seal and locator therefor for a desiccator having a bowl with a horizontal flange and a cover with a mating horizontal flange, said seal and locator consisting entirely of an annular seal of substantially circular cross-section, an annular outwardly extending, horizontal web integrally formed with said seal and having a lesser height than said seal and a vertically arranged annular flange on the outer extremity of said web and extending above and below the latter and having a length greater than the height of said seal whereby said seal may be easily located on a desiccator bowl flange and a desiccator cover easily located on and removed from said seal without interference between said seal, the bowl and the cover.

2. A desiccator seal and locator therefor for a desiccator having a bowl with a horizontal flange and a cover with a mating horizontal flange, said seal and locator consisting entirely of an annular seal of substantially circular cross-section, an annular outwardly extending, horizontal web integrally formed with said seal and having a lesser height than said seal, a vertically arranged annular flange on the outer extremity of said web and extending above and below the latter and a pair of horizontal inwardly directed portions at the upper and lower extremities of said annular flange adapted to overlie the flange of the cover and underlie the flange of said bowl respectively to aid in locating and retaining the seal on the bowl and the cover on the seal, the vertical distance between said web and each of said inwardly directed portions being at least equal to the thickness of the flanges of a desiccator.

3. A desiccator seal and locator therefor for a desiccator having a bowl with a horizontal flange and a cover with a mating horizontal flange, said seal and locator consisting entirely of an annular seal of substantially circular cross-section, an annular outwardly extending, horizontal web integrally formed with said seal and having a lesser height than said seal, a vertically arranged annular flange on the outer extremity of said web and extending below the latter and having a length sufficient to extend below the flange of the bowl, and a horizontal inwardly directed portion at the lower end of said annular flange adapted to underlie the flange of the bowl, the vertical distance between said web and said inwardly directed portion being at least equal to the thickness of the flange of a desiccator bowl whereby said seal may be easily located and retained on a desiccator bowl flange and a desiccator cover easily located on and removed from said seal.

4. A desiccator seal and locator therefor for a desiccator having a bowl with a horizontal flange and a cover with a mating horizontal flange, said seal and locator consisting entirely of an annular seal of substantially circular cross-section, an annular outwardly extending, horizontal first web integrally formed with said seal and having a lesser height than said seal, a first vertically arranged annular flange on the outer extremity of said first web and extending below the latter and having a length at least sufficient to project to a point adjacent the edge of the flange of the bowl, an annular, inwardly extending horizontal second web integrally formed with said seal and having a lesser height than said seal, and a second vertically arranged annular flange on the inner extremity of said second web and extending below the latter, the radial distance between said first and second annular flanges being at least equal to the width of the flange on a desiccator bowl whereby said seal may be easily located on a desiccator bowl flange and a desiccator cover easily located on and removed from said seal without interference between said seal, the bowl and the cover.

5. A desiccator comprising a bowl having a bottom and a continuous wall extending upwardly from said bottom and terminating at its upper extremity in a horizontal flange having an upper, continuous horizontal sealing surface; a seal having a substantially circular cross section disposed on said upper horizontal sealing surface; a removable cover having a continuous horizontal flange at its lower extremity, said horizontal flange having a lower, horizontal sealing surface in engagement with said seal whereby said cover closes said bowl, said cover being maintained on said seal primarily by gravity and without mechanical connections to said bowl whereby said cover may be removed to obtain access to the contents of said bowl by the sole act of lifting; a horizontal ring removably retained on the flange of said bowl by the influence of gravity, said ring being separate from said seal; vertically arranged means secured to said ring at a point inwardly of the extremity of said flanges, said vertically arranged means comprising upwardly projecting portions having an upper surface substantially conforming to the shape of the underside of said cover, and downwardly projecting portions extending below the flange of said bowl whereby the downwardly projecting portions serve to center said ring relative to said bowl and the upwardly projecting portions serve to center said cover relative to the ring and the ring serves to center the seal on the flange of said bowl; the sole sealing contact in said desiccator being between said seal and the horizontal sealing surfaces of said cover and said bowl.

6. A desiccator comprising a bowl having a bottom and a continuous wall extending upwardly from said bottom and terminating at its upper extremity in a horizontal flange having an upper, continuous horizontal sealing surface; a seal having a substantially circular cross section disposed on said upper horizontal sealing surface; a removable cover having a continuous horizontal flange at its lower extremity, said horizontal flange having a lower, horizontal sealing surface in engagement with said seal whereby said cover closes said bowl, said cover being maintained on said seal primarily by gravity and without mechanical connections to said bowl whereby said cover may be removed to obtain access to the contents of said bowl by the sole act of lifting; a horizontal web of lesser height than said seal formed integrally therewith and extending outwardly from said seal to a point beyond an extremity of said flanges; and vertically arranged means integrally formed about the periphery of said web and having a length greater than the height of said seal and extending both above and below said web whereby the lower end of said vertically arranged means aids in centering the seal on the flange of said bowl and the upper end of said vertically arranged means serves to center said cover of said seal; the sole sealing contact in said desiccator being between said seal and the horizontal sealing surfaces of said cover and said bowl.

7. A desiccator comprising a bowl having a bottom and a continuous wall extending upwardly from said bottom and terminating at its upper extremity in a horizontal flange having an upper, continuous horizontal sealing surface; a seal having a substantially circular cross section disposed on said upper horizontal sealing surface; a removable cover having a continuous horizontal flange at its lower extremity, said horizontal flange having a lower, horizontal sealing surface in engagement with said seal whereby said cover closes said bowl; said cover being maintained on said seal primarily by gravity and without mechanical connections to said bowl whereby said cover may be removed to obtain access to the contents of said bowl by the sole act of lifting; a horizontal web of lesser height than said seal formed integrally therewith and extending both inwardly and outwardly from said seal to points inwardly and outwardly of the horizontal flange of said bowl; and vertically arranged means integrally formed on said web at said points and having a length greater than the height of said seal and projecting downwardly at both said points below said web and about the horizontal flange of said bowl to center said seal on said bowl; the sole sealing contact in said desiccator being between said seal and the horizontal sealing surfaces of said cover and said bowl.

8. A desiccator comprising a bowl having a bottom and a continuous wall extending upwardly from said bottom and terminating at its upper extremity in a horizontal flange having an upper, continuous horizontal sealing surface; a seal having a substantially circular cross section disposed on said upper horizontal sealing surface; a removable cover having a continuous horizontal flange at its lower extremity, said horizontal flange having a lower, horizontal sealing surface in engagement with said seal whereby said cover closes said bowl, said cover being maintained on said seal primarily by gravity and without mechanical connections to said bowl whereby said cover may be removed to obtain access to the contents of said bowl by the sole act of lifting; a horizontal web of lesser height than said seal formed integrally therewith and extending outwardly therefrom to a point beyond an extremity of said flanges; and vertically arranged means formed integrally with said web at said point and extending downwardly below the flange of said bowl and having a length greater than the height of said seal; said desiccator further including a portion integrally formed with the lower end of said vertically arranged means and extending horizontally inwardly beneath the flange of said bowl; the sole sealing contact in said desiccator being between said seal and the horizontal sealing surfaces of said cover and said bowl.

9. A desiccator comprising a bowl having a bottom and a continuous wall extending upwardly from said bottom and terminating at its upper extremity in a horizontal flange having an upper, continuous horizontal sealing surface; a seal having a substantially circular cross section disposed on said upper horizontal sealing surface; a removable cover having a continuous horizontal flange at its lower extremity, said horizontal flange having a lower, horizontal sealing surface in engagement with said seal whereby said cover closes said bowl, said cover being maintained on said seal primarily by gravity and without mechanical connections to said bowl whereby said cover may be removed to obtain access to the contents of said bowl by the sole act of lifting; a horizontal web of lesser height than said seal formed integrally therewith and extending outwardly from said seal to a point beyond an extremity of said flanges; and vertically arranged means integrally formed with said web having a length greater than the height of said seal and extending both above and below said web and about the periphery of the latter whereby the lower end of said vertically arranged means aids in centering said seal on the flange of said bowl and the upper end of said vertically arranged means serves to center said cover on said seal; said desiccator further including inwardly directed portions at both the upper and lower ends of said vertically arranged means extending above and below the flange of said cover and the flange of said bowl respectively to aid in retaining said seal on said bowl and said cover on said seal; the sole sealing contact in said desiccator being between said seal and the horizontal sealing surfaces of said cover and said bowl.

References Cited

UNITED STATES PATENTS

| | | | |
|---|---|---|---|
| 922,132 | 5/1909 | Gold | 277—186 |
| 1,463,360 | 7/1923 | Foote. | |
| 2,102,673 | 12/1937 | Brown. | |
| 2,709,534 | 5/1955 | Johnson et al. | 220—46 |
| 2,867,463 | 1/1959 | Snider | 277—225 |
| 3,055,529 | 9/1962 | Cameron et al. | 220—5 |
| 3,080,990 | 3/1963 | Parkinson et al. | 215—40 |
| 3,095,994 | 7/1963 | Bush | 220—46 |
| 3,248,119 | 4/1966 | Smith et al. | 220—46 |

FOREIGN PATENTS

| | | |
|---|---|---|
| 389,174 | 3/1933 | Great Britain. |

RAPHAEL H. SCHWARTZ, *Primary Examiner.*

THERON E. CONDON, *Examiner.*